(12) United States Patent
Herrmann et al.

(10) Patent No.: US 10,067,362 B2
(45) Date of Patent: Sep. 4, 2018

(54) SWITCHABLE MIRROR SYSTEM FOR REFLECTING LASER INPUT DURING PRINTING

(71) Applicant: Xerox Corporation, Norwalk, CT (US)

(72) Inventors: Douglas K. Herrmann, Webster, NY (US); Steven R. Moore, Pittsford, NY (US); Jason M. Lefevre, Penfield, NY (US); Paul J. McConville, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 151 days.

(21) Appl. No.: 15/354,301

(22) Filed: Nov. 17, 2016

(65) Prior Publication Data
US 2018/0136495 A1    May 17, 2018

(51) Int. Cl.
| | |
|---|---|
| B41J 2/447 | (2006.01) |
| B41J 2/455 | (2006.01) |
| G02B 26/08 | (2006.01) |
| G02F 1/01 | (2006.01) |
| G02F 1/00 | (2006.01) |

(52) U.S. Cl.
CPC ............ *G02F 1/0121* (2013.01); *B41J 2/447* (2013.01); *B41J 2/455* (2013.01); *G02B 26/0833* (2013.01); *G02F 1/0009* (2013.01)

(58) Field of Classification Search
CPC ............................ G03F 7/702; G02B 26/0833
See application file for complete search history.

(56) References Cited

U.S. PATENT DOCUMENTS

| | | | |
|---|---|---|---|
| 6,647,166 B2 | 11/2003 | Richardson | |
| 6,762,871 B2 | 7/2004 | Yoshimura | |
| 7,679,808 B2 | 3/2010 | Kim | |
| 8,179,588 B2 | 5/2012 | Yamada et al. | |
| 8,508,791 B1* | 8/2013 | Paul | B41J 2/471 358/1.15 |
| 2004/0196358 A1* | 10/2004 | Murokh | B41J 2/465 347/255 |
| 2010/0039692 A1 | 2/2010 | Yamada et al. | |
| 2016/0093081 A1 | 3/2016 | Kim et al. | |
| 2017/0001459 A1* | 1/2017 | Uehira | B41M 7/0009 |

(Continued)

OTHER PUBLICATIONS

Low Cost, Stable Switchable Mirrors: Lithium Ion Mirrors with Improved Stability, Lawrence Berkeley National Laboratory, printed Sep. 28, 2016, 2 pages.

(Continued)

*Primary Examiner* — Huan Tran
(74) *Attorney, Agent, or Firm* — Kermit D. Lopez; Luis M. Ortiz; Ortiz & Lopez, PLLC

(57) ABSTRACT

A switchable mirror system and method includes a laser imaging module including one or more lasers and one or more DMDs (Digital Micromirror Devices), and a switchable mirror component located in a path upstream from the DMD (or DMDs) to direct a laser from the DMD when there is pause in a printing operation facilitated by said laser imaging module. A non-mechanical and electronic switchable mirror is thus located in the laser path between an LDA (Laser Diode Array) and a DMD to divert energy out of the system and away from the DMD during periods of non-laser imaging without reducing or power down the laser system.

20 Claims, 4 Drawing Sheets

(56) References Cited

U.S. PATENT DOCUMENTS

2018/0009234 A1* 1/2018 Ohi .................... B41J 2/4753
2018/0067300 A1* 3/2018 LeFevre ............... G02B 26/02
2018/0136564 A1* 5/2018 Herrmann ............. G03F 7/702

OTHER PUBLICATIONS

Transition-Metal Switchable Mirrors, From the Lab to the Marketplace 10 years later, Energy Efficient Technologies from Research at the Lawrence Berkeley National Laboratory, printed Sep. 28, 2016, 2 pages.

Yoshimura, K. et al., Development of switchable mirror glass, Synthesiology (2012) 5(4):253-260, translation.

* cited by examiner

SWITCHABLE MIRROR SYSTEM FOR REFLECTING LASER INPUT DURING PRINTING

TECHNICAL FIELD

Embodiments are generally related to DMD (Digital Micromirror Device) systems and applications. Embodiments are also related to marking and printing methods and systems such as, for example, applications involving offset lithography. Embodiments also relate to a switchable mirror system for reflecting a laser input during printing.

BACKGROUND

Offset lithography is a common method utilized in modern printing operations. (Note that for the purpose hereof, the terms "printing" and "marking" are interchangeable.) In a typical lithographic process a printing plate (i.e., which may be a flat plate, the surface of a cylinder, belt, etc.) can be configured with "image regions" formed of, for example, hydrophobic and oleophilic material, and "non-image regions" formed of a hydrophilic material. Such image regions correspond to the areas on the final print (i.e., the target substrate) that are occupied by a printing or a marking material such as ink, whereas the non-image regions correspond to the areas on the final print that are not occupied by the marking material.

The Variable Data Lithography (also referred to as Digital Lithography or Digital Offset) printing process begins with a fountain solution used to dampen a silicone imaging plate on an imaging drum. The fountain solution forms a film on the silicone plate that is on the order of about one (1) micron thick. The drum rotates to an "exposure" station where a high power laser imager is used to remove the fountain solution at the locations where the image pixels are to be formed. This forms a fountain solution based "latent image." The drum then further rotates to a "development" station where lithographic-like ink is brought into contact with the fountain solution based "latent image" and ink "develops" onto the places where the laser has removed the fountain solution. The ink is hydrophobic. An ultra violet (UV) light may be applied so that photo-initiators in the ink may partially cure the ink to prepare it for high efficiency transfer to a print media such as paper. The drum then rotates to a transfer station where the ink is transferred to a printing media such as paper. The silicone plate is compliant, so an offset blanket is not used to aid transfer. UV light may be applied to the paper with ink to fully cure the ink on the paper. The ink is on the order of one (1) micron pile height on the paper.

The formation of the image on the printing plate is done with imaging modules each using a linear output high power infrared (IR) laser to illuminate a digital light projector (DLP) multi-mirror array, also referred to as the "DMD" (Digital Micromirror Device). The mirror array is similar to what is commonly used in computer projectors and some televisions. The laser provides constant illumination to the mirror array. The mirror array deflects individual mirrors to form the pixels on the image plane to pixel-wise evaporate the fountain solution on the silicone plate. If a pixel is not to be turned on, the mirrors for that pixel deflect such that the laser illumination for that pixel does not hit the silicone surface, but goes into a chilled light dump heat sink. A single laser and mirror array form an imaging module that provides imaging capability for approximately one (1) inch in the cross-process direction. Thus, a single imaging module simultaneously images a one (1) inch by one (1) pixel line of the image for a given scan line. At the next scan line, the imaging module images the next one (1) inch by one (1) pixel line segment. By using several imaging modules comprising several lasers and several mirror-arrays butted together, imaging function for a very wide cross-process width can be achieved.

One non-limiting example of a DMD system utilized in the context of a lithographic application is disclosed in U.S. Pat. No. 8,508,791 entitled "Image feedforward laser power control for a multi-mirror based high power imager" which issued to Peter Paul et al on Aug. 13, 2013, and is assigned to Xerox Corporation of Norwalk, Conn. U.S. Pat. No. 8,508,791 is incorporated herein by reference in its entirety.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a switchable mirror system.

It is another aspect of the disclosed embodiments to provide for a switchable mirror system in association with a laser system.

It is yet another aspect of the disclosed embodiments to provide for a non-mechanical but electronic switchable mirror in the laser path between an LDA (Laser Diode Array) and a DMD to divert energy out of the system and away from the DMD during periods of non-laser imaging without reducing or power down the laser system.

The aforementioned aspects and other objectives and advantages can now be achieved as described herein. In an example embodiment, a switchable mirror system can be implemented, which includes a laser imaging module including one or more lasers and one or more DMDs (Digital Micromirror Devices), and a switchable mirror component located in a path upstream from the DMD (or DMDs) to direct a laser from the DMD when there is pause in a printing operation facilitated by said laser imaging module.

The switchable mirror system can be in the path upstream of the DMD (e.g., a DMD chip) to direct incident laser to the DMD chip during the printing operation, and pass the laser energy to a laser dump or trap during even short (e.g., 10 ms to 100 ms) pauses in printing. The switchable mirror system allows for both a mirror mode in which the laser is reflected to the DMD chip as part of the path and onto the thermo-chromatic ink and for a transparent mode that effectively removes the mirror from the laser path and allows the laser to pass-thru straight to a laser dump or trap hidden behind the mirror.

Such a non-mechanical switchable mirror allows the laser to remain powered even during short print breaks in the image while allowing unwanted incident energy to pass-thru the "mirror" and out of the laser path away from the DMD chip reducing the operating temperature of the LIM without inducing any mechanical vibration. The switchable mirror system can be integrated into the print data stream and can be actuated based on, for example, that print data, process speeds, and/or media/ink presence.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
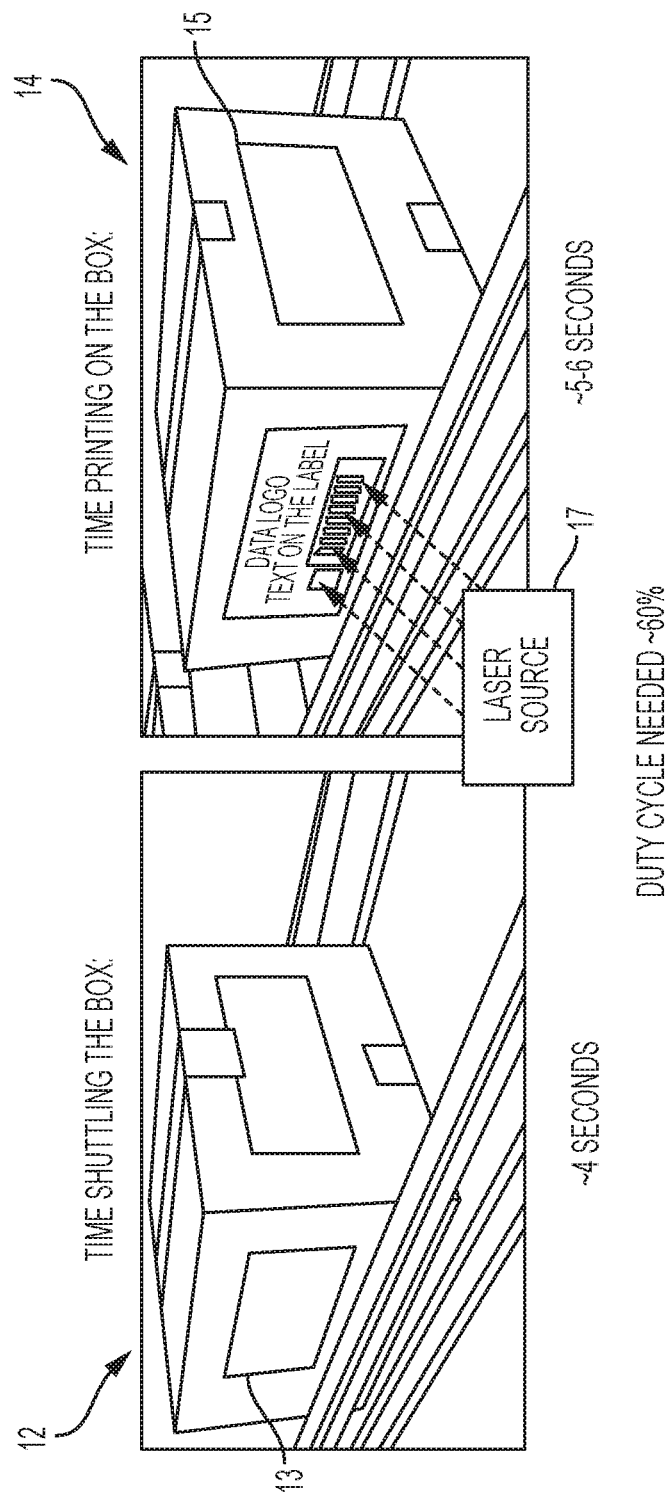
FIG. 1 illustrates an image of a box during time shuttling and an image of another box with time printing thereon, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments relate to a switchable mirror system for reflecting laser input during printing. The disclosed switchable mirror system includes a mirror element that acts as a mirror during printing. This changes where the inherent losses and efficiencies act and how they affect performance. In this case, the mirror physics are more important than the lens physics. For example, if we make the same assumption of a lens of 99.999% efficiency and a mirror efficiency of 85%, during printing the described DMD will receive only 85% of the incoming laser energy delivered to the mirror. During non-printing, the high efficiency lens mode will allow nearly 100% of the incident energy to be directed to the dump.

Whether or not the mirror or the lens is more efficient is not necessarily the point; it is the fact that the efficiency of the specific element mode that drives the performance of the system in different, unique, and specific ways. This same case can be repeated with a swap to the described efficiencies, which again drives different and distinct behavior dependent upon the specific invention being cited.

High-intensity line-source lasers can be utilized to deliver energy selectively to clear thermochromic inks. Such thermochromic inks can change from clear to black at a given energy level. Digitally selective heating of the inks with a LIM (Laser Imaging Module) delivers a digital image on a surface pre-coated with the thermo-chromatic inks. In the disclosed embodiments, laser energy is incident (input) on a DMD chip for 100% of its operating time even though there may be large periods of time when no energy is required as an output from the LIM.

This scenario is very evident in FIG. 1, demonstrating an example usage of LIM technology with thermochromic inks. FIG. 1 illustrates an image 12 of a box 13 during time shuttling and an image 14 of another box 15 with time printing thereon and with a laser source 17 indicated, in accordance with example embodiments. The example scenario shown in FIG. 1 demonstrates that there is a significant amount of time, when the printed substrate is moving in which no imaging needed. A video demonstration of this scenario can be found at: https://www.youtube.com/watch?v=HwADVZtxFp4.

The scenario shown in FIG. 1 and in the video at the aforementioned link amounts to ~5-6 seconds of Imaging "On-time" (e.g., see image 14) and ~4 seconds of Imaging "Off-time" (e.g., see image 12). Thus, in this case all that is needed is a ~60% duty-cycle from an LDA (Laser Diode Array) as input to the LIM for an adequate amount of time to image the object. Note that in FIG. 1, a laser source 17 is shown on the box 15. The digital image content transmitted from the laser source 17 may be composed of, for example, a barcode, and/or a QR (Quick Response) code, and so on as shown in FIG. 1. The FIG. 1 scenario thus provides a basis for arriving at a 60% Laser-ON and 40% Laser-OFF duty-cycle as an example of how the disclosed concept is useful in practice.

Figure 2A:
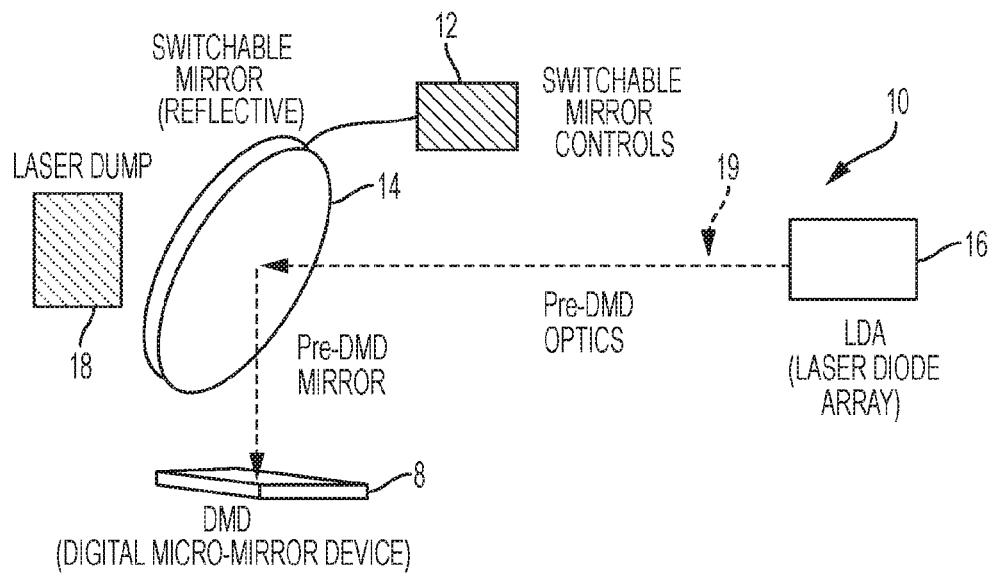
FIG. 2A illustrates a schematic diagram of a switchable mirror system, in accordance with an example embodiment.

FIG. 2A illustrates a schematic diagram of a switchable mirror system 10, in accordance with an example embodiment. The system 10 shown in FIG. 2A incorporates a switchable mirror 14 in the image path between an LDA (Laser Diode Array) and DMD optics including a pre-DMD optics, a pre-DMD mirror 14, and a DMD 8. Switchable mirror controls 12 are associated with (e.g., operably coupled to) the switchable mirror 14. The dashed line 19 shown in FIG. 2A is laser light path from the LDA 16 to the pre-DMD mirror 14 and then to the DMD 8. The switchable mirror 14 is reflective as shown in the FIG. 2A example and is used as a mirror during operation. The switchable mirror 14 can be set to a mirror-activated mode.

A laser dump 18 is shown at the left hand side of arrangement shown in FIG. 2A. The laser dump 18 is an optimal beam dump comprising an optical element that absorbs a beam of light Major design concerns in a beam dump such as laser dump 18 typically includes the management and reduction of back reflections and scattering as well as the dissipation of heat generated by absorption. For low-power systems and less demanding applications, the device can be as simple as a piece of black velvet or flock paper glued onto a stiff backing, but higher-power beam dumps must often incorporate more elaborate features to avoid back-reflection, overheating, or excessive noise. Dumping the beam with a simple flat surface may scatter unacceptably large amounts of light for some applications, even though the direct reflection may be effectively reduced. To minimize scattering, deep, dark cavities can be utilized, which are lined with an absorbing material to dump the beam.

Figure 2B:
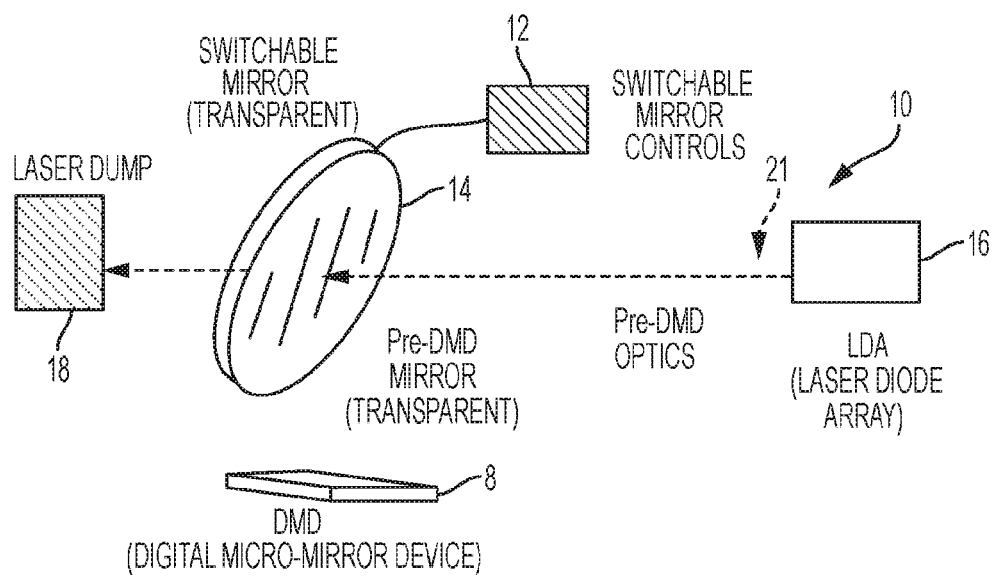
FIG. 2B illustrates a schematic diagram of the switchable mirror system incorporating the switchable mirror in the image path between the LDA (Laser Diode Array) and the DMD Optics, in accordance with another example embodiment.

FIG. 2B illustrates a schematic diagram of the switchable mirror system 10 incorporating the switchable mirror 14 in the image path between the LDA 16 and the DMD Optics (illustrative optics shown), in accordance with another example embodiment. The mirror 14 shown in FIG. 2B can be used as a transparent lens during non-printing to allow laser to trap/dump. The switchable mirror 14 shown in FIG. 2B is set to transparent—but not activated. Thus, it can be appreciated that the switchable mirror 14 switches between a reflective mode as shown in FIG. 2A and a transparent mode as shown in FIG. 2B.

The switchable mirror 14 can be implemented in some example embodiments as a Transition-Metal Switchable Mirrors (TMSM), which is a glass panel configured with a coating capable of switching back and forth between a transparent state and a reflective state. This dynamic window device can include thin-film coatings on the glass, which can be converted from a transparent to a reflecting state and back again, by application of an electric field (e.g., electrochromic switching) or by exposure to dilute hydrogen gas (e.g., gas chromic switching).

Note that in FIGS. 1-5, identical or similar parts or elements refer generally to similar or identical elements, except that in FIG. 2A, for example, the switchable mirror 14 is in a reflective mode and in FIG. 2B the mirror 14 is shown in a transparent mode. Also, the dashed line 21 in FIG. 2B represents the laser light path from the LDA 16 through the transparent mirror 14 and to the laser dump 18, which is different than the light path 19 shown in FIG. 2A.

The switchable mirror system 10 thus includes an electronic switchable mirror 14 in the laser path between the LDA 16 and the DMD 8. This arrangement can be implemented to divert energy out of the system and away from the DMD 8 in periods of non-laser imaging without reducing or powering down the laser system.

The switchable mirror system 10 can be implemented as a device (i.e., electrochromic type) that switches between the mirror state, when a voltage of a few volts is applied, and the transparent state where the laser is directed through the switchable mirror to a laser dump hidden behind the switchable mirror during periods of non-printing. Based on the image imposition loaded to be printed, the switchable mirror system is activated to be mirrored/reflective to the laser for printing of the image and deactivated and transparent during the non-print portions of the imposition to allow the laser to pass-thru to a laser trap or dump.

This system 10 of lasers (e.g., laser diode array 16), chip (e.g., DMD 8), switchable mirror 14, and trap (e.g., laser dump 18) allows the system 10 to optimize incident energy to the chip by only directing the laser to the chip during the image print operation and not during inter-image or inter media gap. This allows the entire system 10 to operate while compensating for the actual image "duty" cycle. Because the switchable mirror is electronic, it is capable of responding to inter-image gaps as well as media gaps with no added mechanical vibration or inertias.

Figure 3:
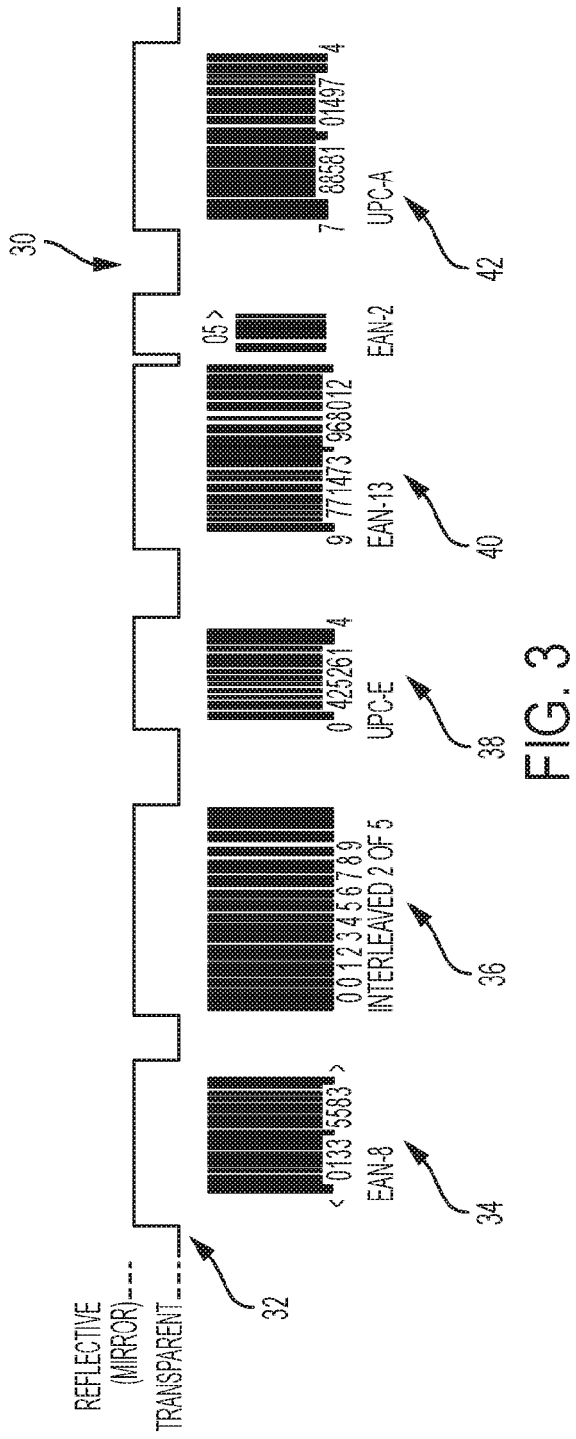
FIG. 3 illustrates a timing diagram with both reflective (mirror) and transparent portions with respect to example bar codes, in accordance with an example embodiment.

FIG. 3 illustrates a timing diagram 30 with both reflective (mirror) and transparent portions with respect to example bar codes 34, 36, 38, 40, and 42, in accordance with an example embodiment. Sequential images (e.g., bar codes 34, 36, 38, 40, 42) with an inter-print gap are shown in FIG. 3 with the associated trigger trace shown (e.g., switchable mirror triggered 14 to reflect laser to DMD 8). A "high" portion of the timing diagram 30 indicates that the mirror 14 energized during image to reflect the laser to the DMD 8.

Thus, the electronic switchable mirror 14 can be located in the laser path between the LDA 16 and the DMD 8. As indicated previously, this can be implemented to divert energy out of the system 10 and away from the DMD 8 in periods of non-laser imaging without reducing or powering down the laser system. Large current draw from the LDA's themselves (e.g., several hundred Amps) makes them impractical to turn-on/off frequently.

The switchable mirror system described herein is thus a device (i.e., electrochromic type) that switches between the mirror state and the transparent state when a voltage of a few volts is applied to redirect the laser to a laser dump during periods of non-printing. Based on the image imposition loaded to be printed, the switchable mirror system is transparent to the laser for printing of the image and is activated to be mirrored/reflective during the non-print portions of the imposition to reflect the laser to a laser trap or dump.

This system 10 of lasers, chip, switchable mirror, and trap allows the system to optimize incident energy to the chip by only directing the laser to the chip during the image print operation and not during inter-image or inter media gap. This allows the entire system to operate while compensating for the actual image "duty" cycle. Because the switchable mirror is electronic, it is capable of responding to inter-image gaps as well as media gaps with no added mechanical vibration or inertias.

The disclosed switchable mirrors, i.e., Transition-Metal Switchable Mirrors (TMSMs), can be configured as glass panels with a coating(s) capable of switching back and forth between a transparent state and a reflective one when activated electronically. This type of system can be implemented alone or in conjunction with other methods of reducing incident laser.

Figure 4:
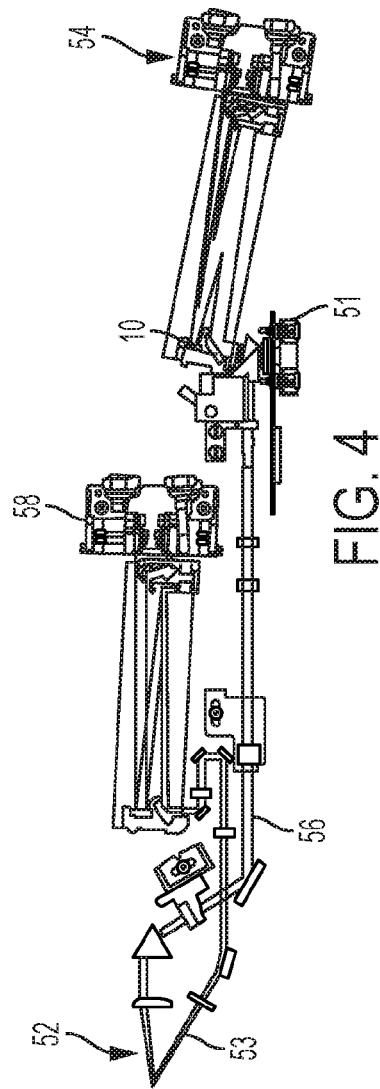
FIG. 4 illustrates a schematic diagram depicting a laser imaging system including imaging LDAs (Laser Diode Arrays) and DMD components, in accordance with an example embodiment.

FIG. 4 illustrates a schematic diagram depicting a laser imaging system including imaging LDAs (Laser Diode Arrays) and DMD components, in accordance with an example embodiment. The system thus includes one or more LDA's such as LDA 54 and one or more DMD's such as, for example, DMD 51. The system may also include one or more preheat LDA's such as a preheat LDA 58. An imaging plane 52 is shown at the left hand side of the configuration shown in FIG. 4. Imaging ray paths 56 and 53 are also shown in FIG. 4. The laser imaging system includes the switchable mirror system 10.

Figure 5:
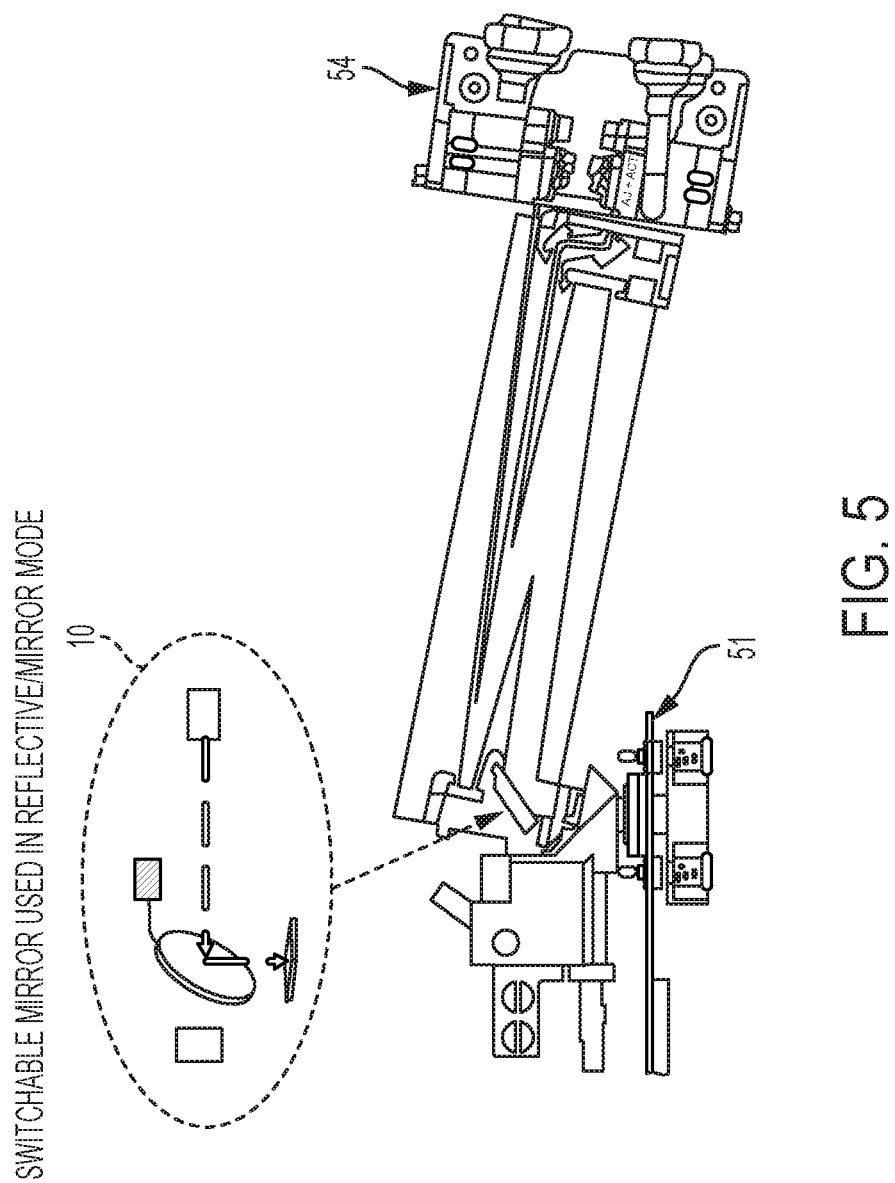
FIG. 5 illustrates a schematic diagram depicting a portion of the laser imaging system shown in FIG. 4 including the LDA and the DMD, in accordance with an example embodiment.

FIG. 5 illustrates a schematic diagram depicting a portion of the laser imaging system shown in FIG. 4 including the LDA 54 and the DMD 51, in accordance with an example embodiment. FIG. 5 specifically depicts a side view of the laser imaging system and the switchable mirror system 10 (i.e., can be implemented as a "subsystem" of the overall laser imaging system). The switchable mirror subsystem 10 acts as an integral mirror in the laser path to the DMD 51. Note that the DMD 51 shown in FIG. 5 is analogous to the DMD 8 shown in FIGS. 2A-2B. That is, the DMD 51 can be implemented in some example embodiments as DMD 8.

The switchable mirror 14 can thus serve as a primary mirror switching the last path located upstream from the thermally sensitive DMD chip to selectively transmit the input laser energy to the DMD or away from the DMD to dissipate incident energy. The switchable mirror system 10 can function as a primary element of the laser path and reflects the laser to the DMD when printing (Mirrored—Activated) and to allow that laser energy to pass-thru to a laser trap behind the "mirror" during the time in which the laser is not needed (Transparent—Not Activated) limiting the power delivered to the DMD.

Based on the image imposition and media spacing, the switchable mirror is a primary reflective element of the optics path where it reflects the incident light to the DMD 8 when energized to reflect and when not energized it will allow that laser energy to pass-thru the transparent "mirror" and away from the temperature sensitive components of the LIM to a laser dump. Image content information is available to the switchable mirror 14, so that it can switch as image content changes minimizing amount of laser energy incident on the DMD chip 8 (or DMD 51) and allowing for image dependent activation. The adjustable mirror opacity can be utilized to limit incident laser to DMD 8 for temporary lower power image requirements or reduced energy to the DMD 8.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A switchable mirror system, comprising:
    a laser imaging module including at least one laser and at least one DMD; and
    a switchable mirror component located in a path upstream from said at least one DMD to direct a laser from said at least one DMD when there is pause in a printing operation facilitated by said laser imaging module.

2. The system of claim 1 further comprising a mirror mode and a transparent mode, wherein said switchable mirror system allows for both said mirror mode in which said laser is reflected to said at least one DMD as a part of said path and onto a thermo-chromatic ink and for said transparent mode, removes said at least one mirror from said path of said laser and allows said laser to pass-through directly to a laser dump or a trap hidden behind said at least one mirror.

3. The system of claim 1 wherein said switchable mirror comprises a non-mechanical switchable mirror that allows said laser to remain powered during said printing operation while allowing unwanted incident energy to pass through said at least one mirror and out of said path of said laser away from said at least one DMD to reduce an operating temperature of said laser imaging module without inducing mechanical vibration.

4. The system of claim 1 wherein said switchable mirror is integrated into a print data stream and is actuated based on print data associated with said print data stream.

5. The system of claim 1 wherein said switchable mirror is integrated into a print data stream and is actuated based on process speeds.

6. The system of claim 1 wherein said switchable mirror is integrated into a print data stream and is actuated based on a media/ink presence.

7. The system of claim 1 wherein said switchable mirror is integrated into a print data stream and is actuated based on print data associated with said print data stream, process speeds, and a media/ink presence.

8. The system of claim 1 wherein said switchable mirror comprises a TMSM (Transition-Metal Switchable Mirror).

9. The system of claim 1 wherein said switchable mirror comprises a plurality of glass panels with a coating for switching back and forth between a transparent state and a reflective state when electronically activated.

10. A switchable mirror system, comprising:
    a laser imaging module including at least one laser and at least one DMD; and
    a switchable mirror component having a mirror mode and a transparent model, said switchable mirror component located in a path upstream from said at least one DMD to direct a laser from said at least one DMD when there is pause in a printing operation facilitated by said laser imaging module.

11. The system of claim 10 wherein said switchable mirror system allows for both said mirror mode in which said laser is reflected to said at least one DMD as a part of said path and onto a thermo-chromatic ink and for said transparent mode, removes said at least one mirror from said path of said laser, and allows said laser to pass-through directly to a laser dump or a trap hidden behind said at least one mirror.

12. A switchable mirror method, comprising:
    providing a laser imaging module including at least one laser and at least one DMD; and
    locating a switchable mirror located in a path upstream from said at least one DMD to direct a laser associated with said imaging module when there is pause in a printing operation facilitated by said laser imaging module.

13. The method of claim 12 further comprising providing a mirror mode and a transparent mode, wherein said switchable mirror system allows for both said mirror mode in which said laser is reflected to said at least one DMD as a part of said path and onto a thermo-chromatic ink and for said transparent mode, removes said at least one mirror from said path of said laser, and allows said laser to pass-through directly to a laser dump or a trap hidden behind said at least one mirror.

14. The method of claim 12 wherein said switchable mirror comprises a non-mechanical switchable mirror that allows said laser to remain powered during said printing operation while allowing unwanted incident energy to pass through said at least one mirror and out of said path of said laser away from said at least one DMD to reduce an operating temperature of said laser imaging module without inducing mechanical vibration.

15. The method of claim 12 wherein said switchable mirror is integrated into a print data stream and is actuated based on print data associated with said print data stream.

16. The method of claim 12 wherein said switchable mirror is integrated into a print data stream and is actuated based on process speeds.

17. The method of claim 12 wherein said switchable mirror is integrated into a print data stream and is actuated based on a media/ink presence.

18. The method of claim 12 wherein said switchable mirror is integrated into a print data stream and is actuated based on print data associated with said print data stream, process speeds, and a media/ink presence.

19. The method of claim 12 wherein said switchable mirror comprises a TMSM (Transition-Metal Switchable Mirror).

20. The method of claim 12 wherein said switchable mirror comprises a plurality of glass panels with a coating for switching back and forth between a transparent state and a reflective state when electronically activated.

* * * * *